United States Patent
Ramsey et al.

(10) Patent No.: US 9,648,256 B2
(45) Date of Patent: May 9, 2017

(54) TACTICAL MOBILE SURVEILLANCE SYSTEM

(71) Applicant: Black Diamond Xtreme Engineering, Inc., Cannon Falls, MN (US)

(72) Inventors: Brent Ramsey, Lakeville, MN (US); Ray Schoenfelder, Zumbrota, MN (US); David Hail, Tulsa, OK (US)

(73) Assignee: BLACK DIAMOND XTREME ENGINEERING, INC., Farmington, MN (US)

( * ) Notice: Subject to any disclaimer, the term of this patent is extended or adjusted under 35 U.S.C. 154(b) by 0 days.

(21) Appl. No.: 14/871,367

(22) Filed: Sep. 30, 2015

(65) Prior Publication Data

US 2016/0090132 A1    Mar. 31, 2016

Related U.S. Application Data

(60) Provisional application No. 62/057,489, filed on Sep. 30, 2014.

(51) Int. Cl.
*B60K 1/00* (2006.01)
*H04N 5/33* (2006.01)
(Continued)

(52) U.S. Cl.
CPC ............. *H04N 5/332* (2013.01); *G01V 8/10* (2013.01); *H04N 5/23203* (2013.01); *H04N 7/183* (2013.01); *H04N 2005/2255* (2013.01)

(58) Field of Classification Search
CPC ........ F04N 5/332; F04N 5/2256; F04N 7/183; F04N 7/181; B60K 1/00; B60K 6/20; B60K 6/42
See application file for complete search history.

(56) References Cited

U.S. PATENT DOCUMENTS 4,326,218 A    4/1982   Coutta et al.
6,249,567 B1 *  6/2001   Rothschild ............. G01N 23/20
                                                         378/63
(Continued)

FOREIGN PATENT DOCUMENTS

WO    2004110054 A1    12/2004
WO    2014005804 A1    1/2014

OTHER PUBLICATIONS

Sukumar Sreenivas R. et al. Robotic three-dimensional imaging system for under-vehicle inspection. Journal of Electronic Imaging, Jul.-Sep. 2006/vol. 15(3).
(Continued)

*Primary Examiner* — Hau Phan
(74) *Attorney, Agent, or Firm* — Westman, Champlin & Koehler, P.A.; Z. Peter Sawicki; Amanda M. Prose (57) ABSTRACT

A system for inspection of the undercarriage of a vehicle. The system may comprise a mobile unit or a stationary unit configured to fit in a space below the vehicle for gathering and transmitting data, images and or recordings, of the undercarriage of the vehicle. The system comprises at least one camera and preferably a plurality of cameras and at least one light source and preferably a plurality of light sources mounted on a device configured to fit in the space below a vehicle without hindering the inspection of the undercarriage of the vehicle. Photoelectric lasers or laser scanning systems may also be incorporated into the device. Data gathered by the cameras and/or laser systems can be transmitted to a controller and in some embodiments compared to standard data for recognition and potentially warning of an unexpected condition of the undercarriage without requiring physical human inspection.

18 Claims, 6 Drawing Sheets

(51) Int. Cl.
*G01V 8/10* (2006.01)
*H04N 7/18* (2006.01)
*H04N 5/232* (2006.01)
*H04N 5/225* (2006.01)

(56) References Cited

U.S. PATENT DOCUMENTS

| | | |
|---|---|---|
| 6,356,299 B1 | 3/2002 | Trosino et al. |
| 6,369,849 B1 | 4/2002 | Rzyski |
| 6,583,730 B2 | 6/2003 | Lang et al. |
| 6,856,344 B2 | 2/2005 | Franz |
| 7,190,259 B2 | 3/2007 | Kumata et al. |
| 8,054,182 B2 | 11/2011 | Cutchis |
| 2002/0097321 A1 | 7/2002 | McBride |
| 2003/0185340 A1 | 10/2003 | Frantz |
| 2004/0227108 A1 | 11/2004 | Tuominen et al. |
| 2006/0170768 A1* | 8/2006 | Riley ............ H04N 7/181 348/143 |
| 2007/0030349 A1* | 2/2007 | Riley ............ H04N 7/181 348/143 |
| 2007/0046237 A1* | 3/2007 | Lakshmanan ...... F41H 7/005 318/568.11 |
| 2007/0273760 A1 | 11/2007 | Morrison et al. |
| 2008/0136625 A1* | 6/2008 | Chew ............ G01V 5/0008 340/540 |
| 2013/0251105 A1 | 9/2013 | Kotowski et al. |

OTHER PUBLICATIONS

International Search Report and Written Opinion issued in related International Application No. PCT/US2015/053272, mailed Apr. 14, 2016.

* cited by examiner

TACTICAL MOBILE SURVEILLANCE SYSTEM

CROSS-REFERENCE TO RELATED APPLICATIONS

This application claims the benefit of priority from U.S. Provisional Application Ser. No. 62/057,489, filed Sep. 30, 2014, the contents of which are incorporated herein in their entirety.

FIELD OF THE INVENTION

The present invention relates generally to surveillance systems for vehicles of all types. More specifically, the present invention relates to on-site surveillance and inspection systems for the underside of a vehicle.

BACKGROUND OF THE INVENTION

The underside of a vehicle is generally difficult to inspect without various tools including mirrors and light sources or requires an inspector to lay or crouch on or proximate the ground to physically see under the vehicle. For maintenance purposes, a vehicle is either hoisted above the ground, or parked over an opening wherein a mechanic can access the area below the vehicle for inspection. However, at locations where on-site surveillance and inspection of various vehicles coming and going is required for safety and security, the underside of each vehicle can be difficult to inspect for foreign objects, some of which may be dangerous or illegal.

Prior art systems for surveillance and inspection are limited and generally require a mirror affixed to a long stick, and a portable light source to be shone under the vehicle for real-time surveillance by an operator moving the mirror as needed. Alternatively, some prior art systems utilize a camera which is positioned along the underbody of a vehicle for capturing series of still images, which can then be pieced together and analyzed to determine the state of the underbody of the vehicle. The prior art systems for on-site surveillance and/or inspection either require significant mobility and time consumption by an operator or fail to incorporate a system for easy, comprehensive, selectively controlled and real-time surveillance and inspection.

SUMMARY OF THE INVENTION

An aspect of the present disclosure relates to a system for inspecting the undercarriage of a vehicle or other carriage. The system may comprise a mobile unit for inspection of the underside of the vehicle, including recording and scanning devices being movable underneath the vehicle remotely. The inspection system for inspecting the undercarriage of a vehicle comprises a motorized wheeled carriage comprising a frame having a center platform mounted thereon and at least one retractable aim extending outwardly from the frame. The carriage further comprises a plurality of cameras wherein at least one camera is mounted on the platform and at least one camera is mounted on the at least one retractable beam and a plurality of lights comprising at least one light being mounted on the platform and at least one light being mounted on the at least one retractable beam. The system further comprises a monitor positioned away from the carriage and configured for wirelessly viewing a video stream transmitted from the plurality of cameras. The motorized wheeled carriage is configured to pass underneath the vehicle and the cameras and lights are configured to illuminate the undercarriage of the vehicle and transmit video of the undercarriage of the vehicle to the monitor for surveillance and/or inspection.

Another aspect of the present disclosure relates to a stationary unit for surveillance and/or inspection of the underside of a vehicle. The inspection system for inspecting the undercarriage of a vehicle may alternatively comprise a ground engaging container having an open top and comprising a plurality of cameras mounted therein as well as a plurality of lights mounted therein. The housing or container is stationary and may generally be secured to the ground or within an opening in the ground substantially the same shape and size as the housing and configured to flushly receive the housing therein.

The system further comprises a monitor positioned away from the container and configured for wirelessly viewing a video stream transmitted from the plurality of cameras or for viewing other data received from the system, including warnings of unsafe or unexpected conditions including deviations in the standard arrangement of an wherein the container is secured to the ground and stationary in a location for the vehicle to pass over the container wherein the cameras and lights are configured to illuminate the undercarriage of the vehicle and transmit video of the undercarriage of the vehicle to the monitor as the vehicle passes over the container.

Yet another aspect of the present disclosure relates to a method for inspecting the undercarriage of a vehicle or other carriage, such as a train car. The method comprises positioning the vehicle to be inspected over an inspection system comprising at least one camera and at least one lighting element. The vehicle may be slowly moved over the inspection system or alternatively, the inspection system may be a mobile unit that is remotely controllable to move below or under the vehicle for inspection of the undercarriage. The inspection system, whether mobile or stationary is configured to fit in a space below the vehicle with the camera lens(es) oriented upwardly toward the vehicle undercarriage with the lighting elements activated to illuminate the field of view of the camera(s) for proper video and/or image taking. The camera(s) are directed to scan the undercarriage and the images/video taken are transmitted to a viewing screen. From these images, the state of the undercarriage can be inspected and unexpected conditions can be detected.

Alternatively, or in addition to the camera(s) for inspecting the undercarriage, a laser inspection system and/or infrared inspection system may be also used. Data from the inspection system is transmitted to a controller that is configured to transmit the data to either a viewing screen positioned away from the inspection system or to transmit the data to a recognition system which is configured to automatically compare the inspection data received to standard data for the specific undercarriage dimensions etc. to detect deviations therefrom and to issue an initial warning indicating further inspection is required.

DETAILED DESCRIPTION OF THE INVENTION

The present disclosure is directed to an on-site surveillance or inspection system for the underside of a vehicle. The surveillance or inspection system may comprise a stationary system or a mobile unit configured for determining the condition of the undercarriage of a vehicle. For example, the condition of the undercarriage of the vehicle can be determined with respect to factory schematics or standards for the make and/or model, including modifications, of the vehicle. The system may also be used with various vehicles or modes of transportation, including personal, public and/or mass transportation, including but not limited to cars, buses, trucks, trains, and/or subway cars. The system includes a housing unit having video cameras, illumination (e.g. light) sources and may further comprise a laser source attached thereto wherein the housing is of a size such that a vehicle can easily pass over the housing and thus the cameras, laser(s) and light sources. Alternatively, the housing may be mobile such that the housing moves below a stationary vehicle for example, the housing unit may be a mobile unit 10 or a stationary unit 50.

Figure 1:
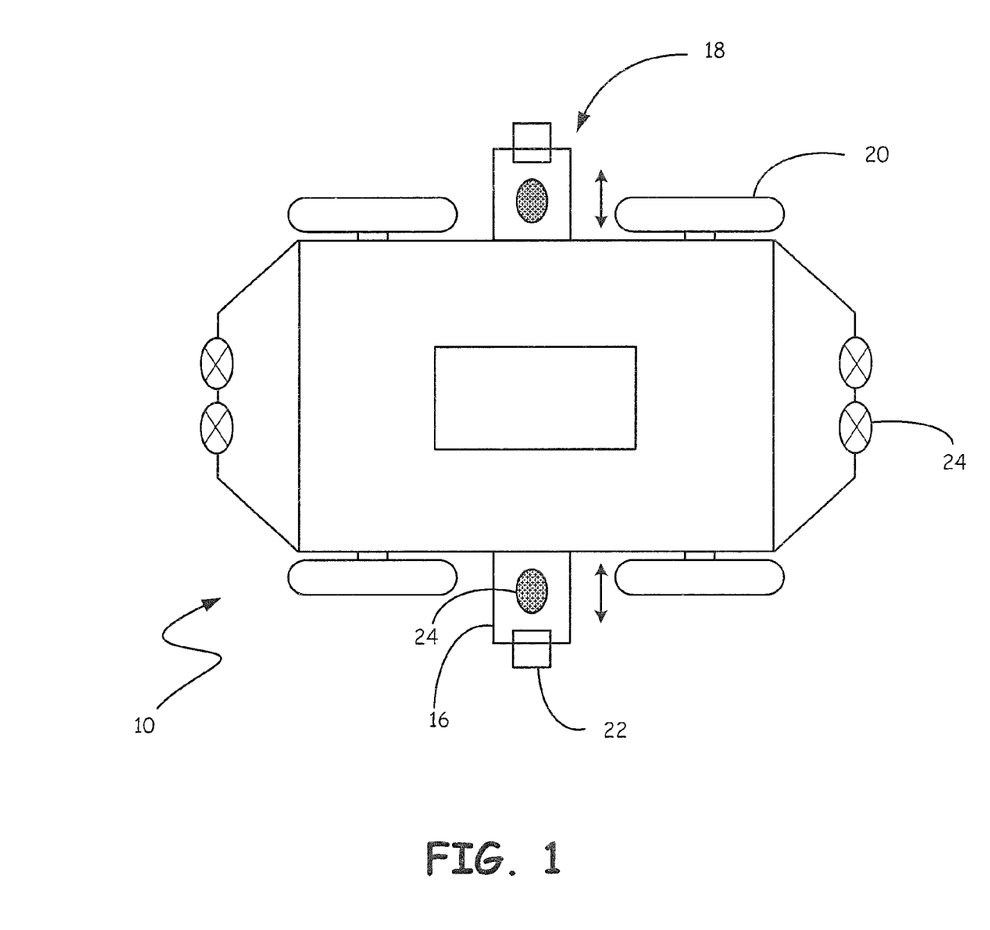
FIG. 1 is a top view of a mobile tactical surveillance unit.
Figure 2:
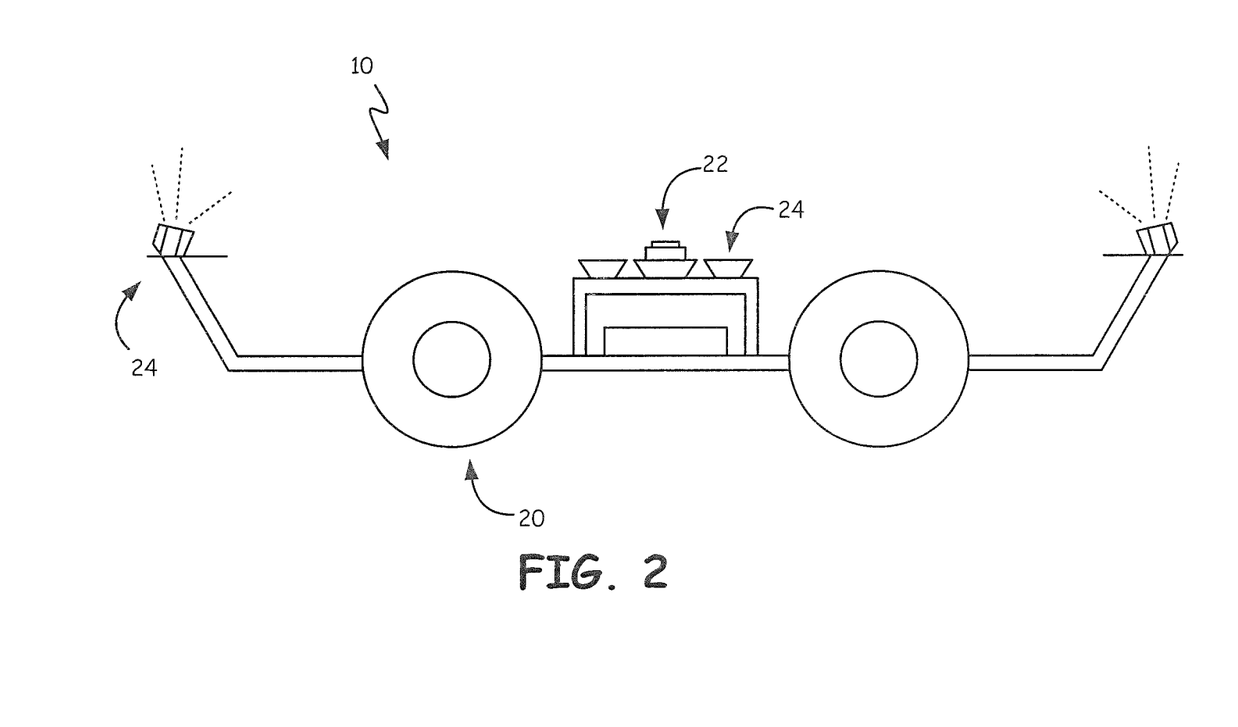
FIG. 2 is a side view of the mobile tactical surveillance system.
Figure 3:
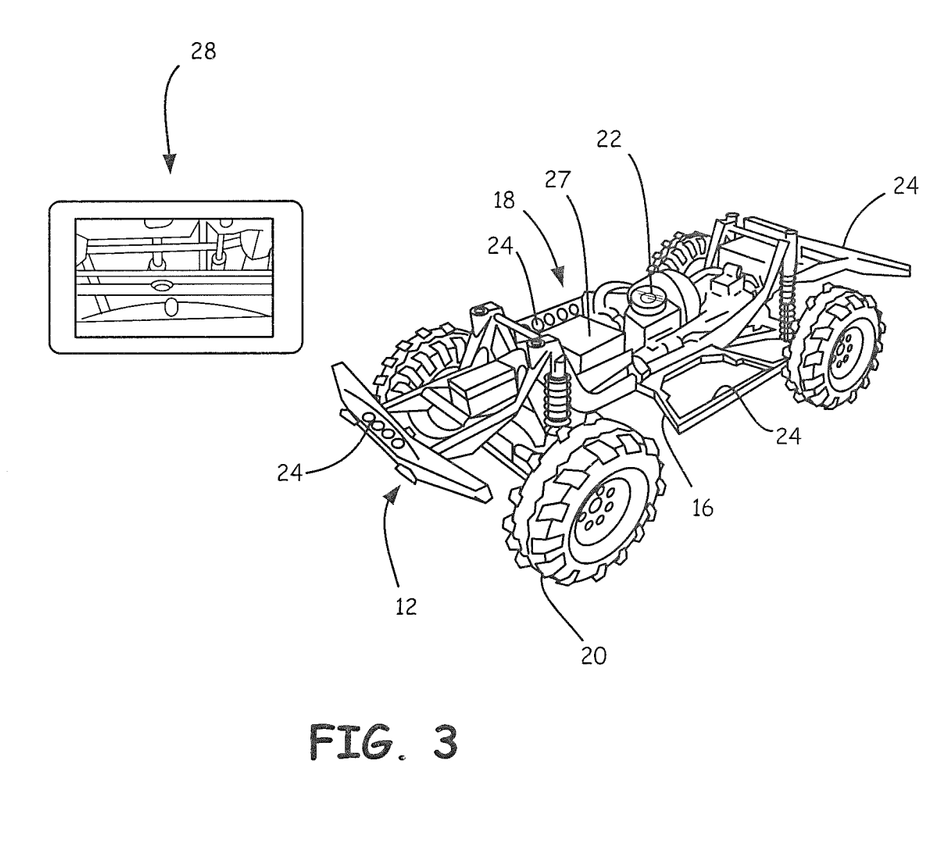
FIG. 3 is front perspective view of a stationary tactical surveillance system according.

As illustrated in further detail in FIGS. 1-3, the housing unit may be a mobile unit 10. The mobile unit is a wheeled cart or frame 12. In the embodiment of the present invention, the mobile unit has a wheeled frame 12 for supporting a center mount 14 and retractable arms 16 and 18. The anus 16 and 18 are retractable into the center portion of the frame. The frame 12 is mobile via connection to two pairs of wheels 20. The wheels generally comprise small diameter off-road capable tires. For example, the tires may be knobbed tires, allowing the mobile unit to be used across varying terrains. The frame 12 and wheels 20 are configured so that the height and size of the constructed mobile unit 10 is sufficiently small enough to fit underneath a vehicle or carriage for inspection of the underside of the vehicle or carriage. For example, the height clearance of the unit 10 from base to top surface may be approximately in the range of 5-12 inches, or more preferably, the height clearance may be approximately 7-8 inches. Two pairs of wheels provide the general perimeter of the unit 10.

The frame 12 comprises a center support which is positioned above the axles connected to each wheel in a pair of wheels, so that the frame is relatively low with respect to a wheel engaging surface, or to the ground. The frame 12 is generally rectangular in shape, having a front and rear area and opposing side supports. The frame 12 may be comprised of titanium, steel, aluminum or another lightweight but durable material. Moreover, the frame and the unit itself may utilize Kevlar components for stability and safety, as well as for impact resistance and protection of the components of the mobile unit 10 and attachments thereto.

Retractable arms 16 and 18 are attached to the frame 12 on the opposing sides of the frame, however, additional arms at any location on the frame may be attached for various surveillance and inspection needs. Each arm 16 and 18 can be extended outwardly from the frame or retracted inwardly toward the center portion of the frame depending on the width of the inspection or surveillance area or for transport and storage as retracting the arm compacts the width of the mobile unit 10.

The center mount 14 and each arm 16 and 18 may have a camera 22 mounted thereto. Light sources may be mounted around the perimeter of the frame 12 to aid in camera inspection and recognition. For example, light source 24 is mounted on a respective upward facing surface of the frame 12 on opposing sides and on adjacent opposing sides with respect to the arms. The cameras 22 and light sources 24 are each mounted so as to be directed upwardly and outwardly from the frame allowing the light sources and the cameras to be used for inspection and surveillance of the underside of a vehicle which is positioned over the unit 10 and/or which the unit 10 may pass under. The center mount 14 is positioned approximately in the center of the frame 12 of the mobile unit 10. The center mount, as illustrated in the figures, comprises two upwardly facing light sources 24 and a camera 22 positioned proximate and between the light sources 24. Each arm 16 and 18 is similarly mounted to the frame 12 for slidable retraction and extension on the sides of the unit 10. Each arm 18 and 18 is further equipped with a mounted camera 22 and light source 24 on a distal end. Thus, the arms can be positioned extending outwardly from opposing sides of the unit 10 so that in cooperation with the center mount, substantially the entire width of the underbody of a vehicle can be inspected.

The unit 10 is mobile to travel underneath the vehicle and along its entire length so as to capture video for real time inspection and for recognition to inspect the entire length of the underbody of a vehicle. As the arms extend from the unit to increase the width of the unit with respect to the camera positions, the width of the inspection area can range anywhere from approximately six inches when only the center mount camera and light source is needed up to approximately six feet if the arms are extended and both opposing arm cameras and light sources are used for inspection.

The light source 24, for example, may be an LED lamp or light, or a series of LED lamps or lights. The light emitted from the light source is sufficiently bright for illumination of the underbody of the vehicle and for the video to capture the details of the underbody of the vehicle, without whiting out or otherwise hindering the camera or distorting the images captured thereby. The camera 22 may be a small camera for capturing still photos or video. It is further contemplated that the cameras 22 may be infrared capable or be thermal imaging capable for detecting hazardous conditions, including but not limited to the detection of C4 and other plastic explosives. The camera 22 may comprise a wide angle lens with infrared technology for further inspection of the undercarriage. When capturing is complete, three dimensional and real time views of the surveillance or inspection area, the cameras 22 are high-definition, small camcorders or video cameras. The cameras can be lightweight and durable can also be controlled remotely.

The light sources and cameras may be battery operated, or may be wired to a control unit attached to the frame 12 for power, and, storage and transmission of the recorded images. The battery 27 may also be used to power the mobile control unit 10 itself. Additional light sources 24 may be mounted to the front and rear sections of the frame to provide additional light for inspection.

The unit 10 can be remotely controlled for movement underneath a vehicle by a control unit operational from a distance in the event of unsafe conditions, which may increase the safety of the operators and inspectors. The unit 10 is an all-wheel drive, self-contained, remote controlled unit, with the motor and gear components located on the frame 12.

Figure 4:
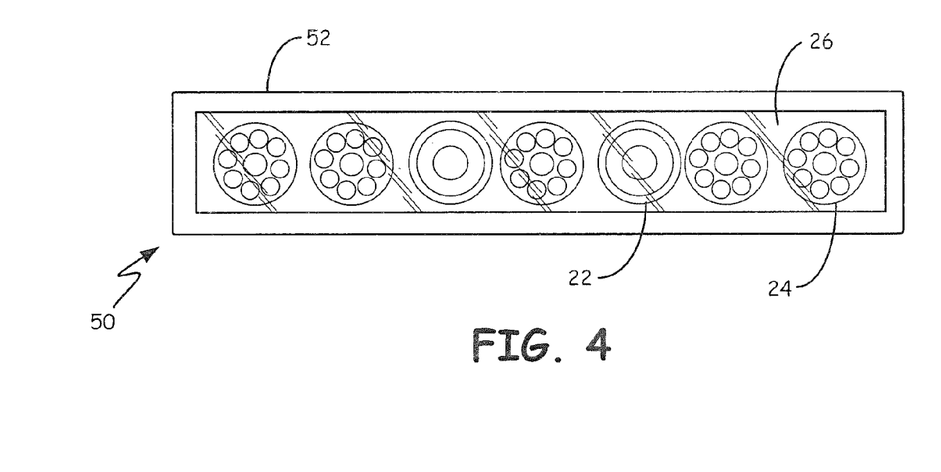
FIG. 4 is a top view of an embodiment of a stationary unit.
Figure 5:
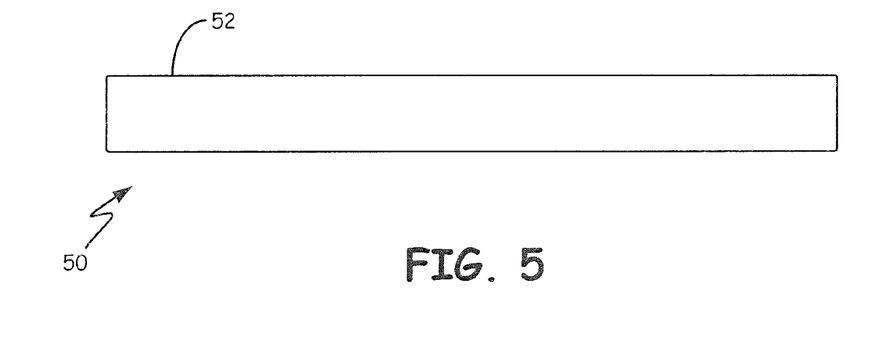
FIG. 5 is a side view of a stationary tactical surveillance system.
Figure 6:
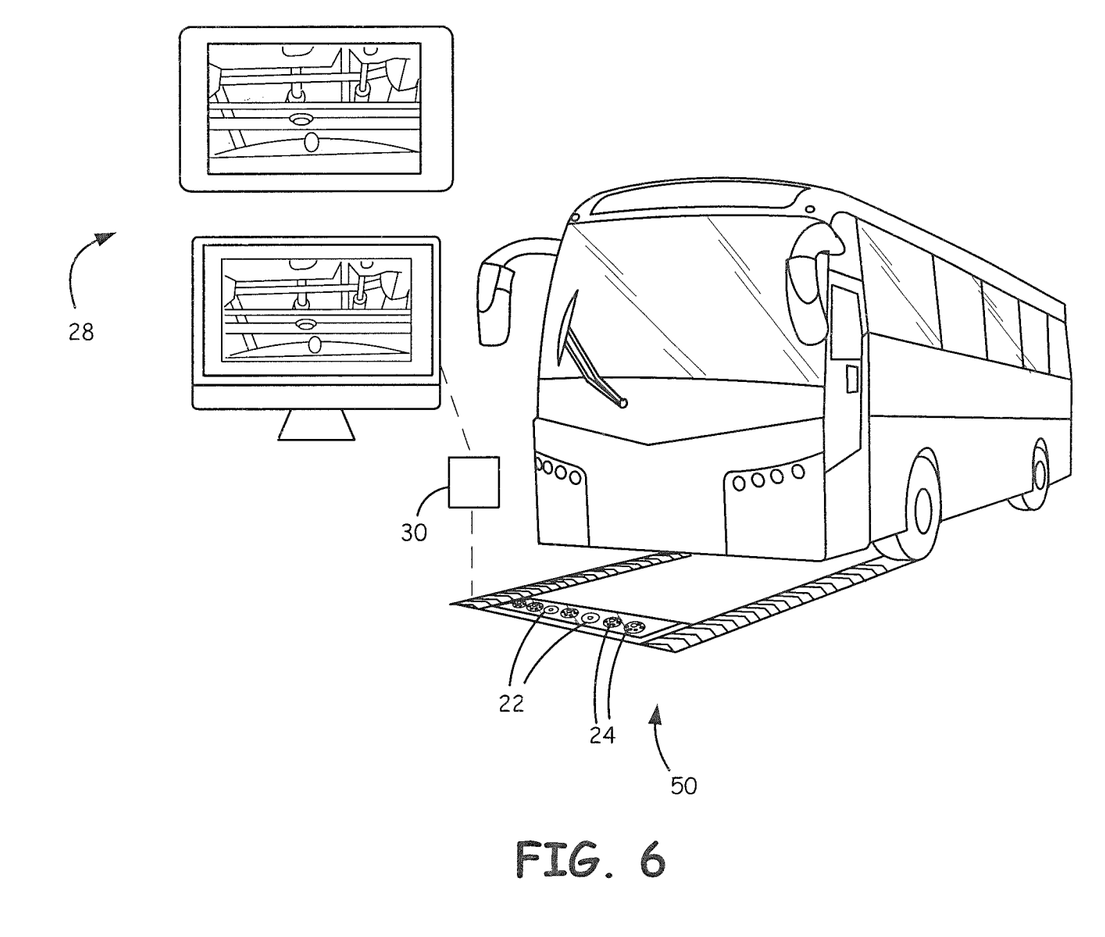
FIG. 6 is a perspective view of the stationary unit and a viewing unit.

In another embodiment, the surveillance or inspection unit may be a stationary tactical surveillance unit. As illustrated in further detail in FIGS. 4-6, the housing may be a ground engaging unit 50 or as illustrated in FIGS. 4-6, the unit 50 may be installed as an in-ground stationary unit. The stationary unit 50 is positioned as a surveillance unit secured on-site such that a vehicle would drive over the stationary unit for inspection and surveillance. The underside of the vehicle is then illuminated and captured on video and transmitted to a monitor wherein an operator can view the underside of the vehicle for surveillance and inspection.

The stationary unit 50 may be an open top container or approximately rectangular housing 52 wherein a plurality of camera sources 22 and light sources 24 are mounted therein, facing upwardly and out of the open top container. The housing 52 may comprise a lightweight carbon fiber material or similar material configured to receive and securely hold the inspection system. The open top container 50 may also be fitted with a clear, visually and optically transparent protective cover 26. Example of the protective cover 26 include but are not limited to high grade polycarbonate glass and Plexiglas materials. The protective cover may be a material that does not obstruct, distort or hinder the cameras 22 in capturing surveillance under the vehicle. The cover however, will protect the container 50 and the contents from debris, environmental contaminant and/or weather effects. Cameras 22 and light sources 24 may be substantially similar in type and operation to those described previously in this description with respect to the mobile unit. The container 50 includes the plurality of cameras 24 and light sources 56 mounted therein and approximately aligned linearly along the container 52. The cameras 22 and light sources 24 can be mounted in a setting within the box for battery operation or wired for connection to an external power, transmission and control unit.

When the unit 50 is installed for surveillance, the unit 50 is positioned transversely to a vehicle travel path. Thus, the container 52 is positioned to extend across a road or lane in which a vehicle would drive. Alternatively, the unit may be positioned under a platform for inspection of various carriages such as train cars or subway cars. The cameras 22 extend along the width of the underside of the vehicle so as to capture video images along substantially the entire width of a vehicle underbody and along approximately the entire length of a vehicle as the vehicle moves or drives slowly over the stationary unit 50. The container 12 may also be positioned transversely between a retractable tire guide 54 for guiding a vehicle over the stationary unit 50 for inspection and surveillance.

As illustrated in FIG. 6, the unit 50 is secured to a selected location on the ground, road, pavement, tarred, travel surface, platform or other inspection surface 58 by securing a ground engaging base or floor of the container 52 to the surface 58. As illustrated in FIGS. 4-6, the unit 50 is mounted within an aperture or opening in the surface 58, the opening approximately the size of the unit 50 such that when inserted into the ground opening, the upper surface of the unit is approximately flush or slightly lower than the ground surface. The cameras 22 and light sources 24 are then positioned proximate the ground surface and substantially level with the ground surface.

In one embodiment, as illustrated in FIGS. 5-6, the unit 50 may be approximately 4.5 to 6.5 feet wide, and preferably 5 to 6 feet wide and having a height of approximately 3-6 inches, or preferably 4-5 inches. This unit may be placed and secured temporarily to a ground engaging surface or may be mounted into the ground and secured in an opening in the ground so that the unit is flush with the ground surface or raised above the ground surface slightly. The depth (crosswise) of the unit 50 may be approximately 8-11 inches, and preferable is in the range of 9-10 inches. The opening is thus configured to securely receive cameras and lighting elements within the unit 50. For example, two cameras may be placed adjacently in the unit 50 or spaced apart along the width of the unit 50 with lighting elements positioned therein in alternating and/or adjacent arrangements.

The site in which the unit 50 can be mounted may be near a highly secured location or area, or a location where access is generally restricted. Alternatively, it may mounted in or near an inspection unit for new vehicles or for standard testing of fitness for use. For example, the area may be an airport including the entrances to restricted areas for delivery or transport.

The cameras can be operated remotely from a station positioned proximate the vehicle travel path, or on-site area. Video images from the cameras can then be transmitted to a viewing monitor or viewing unit 28 in substantially the same manner as described previously with respect to the mobile unit 10. The viewing unit may be a hand held tablet or a desktop system for viewing the transmitted images and/or data.

The system as described herein is used to inspect the underside of a vehicle. The undercarriage may be inspected visually by way of camera inspection or may also be inspected via laser scanning of the dimensions of the undercarriage. A photoelectric laser sensor or visible laser light sensor may be used to sense small objects in or on the undercarriage or to scan the undercarriage and relay data to a controller 30 related to the presence of objects or missing objects in the undercarriage. The video and/or images and data captured during surveillance and/or inspection of the underside of the vehicle body may be transmitted, live in real time, to a viewing unit 28 so that the operator may view the underside of the vehicle substantially simultaneously with the movement of the unit 10 under the vehicle or after the unit has gathered video from underneath the vehicle. The video may also be recorded for later reference. Thus, if an item of interest or concern is spotted, an operator can stop, reverse or slow down the mobile unit 10 to further inspect or re-inspect a selected area. The video captured from the cameras 22 is transmitted to the viewing unit 28 by a wireless connection and transmission. The viewing unit 28 is a control pad and monitor which can also be a hand held or mobile device.

Alternatively, the cameras may be used in connection with recognition software to capture and automatically compare the dimensions and structure of the undercarriage inspected to a database of schematics, makes, models and undercarriage clearance specifications relating to the specific make/model being inspected to make an initial indication of compliant undercarriage structure or to indicate that a deviation in the undercarriage is present that requires further inspection by the system or human intervention. The system may be used to inspect the underside of a vehicle by visual inspection with the camera and lighting elements or by laser inspection wherein a laser unit scans the undercarriage for detection of known and/or unknown conditions. The visual or laser inspection results are compared to a database containing the standard specifications and schematics of a variety of vehicles and/or carriages, for example, a train carriage or the undercarriage of a coach bus. This database is populated with and stores the specifications and standard dimensions, components, arrangement, positioning, depth etc. of the undercarriage of various makes and models. The inspection data gathered by the system is then compared for recognition. If the recognition process indicates there is an unknown or alternatively, a missing dimension or object in the undercarriage, a warning indicator is sent to the viewing unit, monitor and/or control pad. The warning indicator may be a warning light, an annunciation or other type of visual or audial signal. This warning indicates that further inspection, with the system or additionally with human intervention, may be required. If the recognition step indicates that the no abnormal conditions exist an "OK" signal may be sent to the control pad, viewing unit and/or monitor. The control unit is configured with this recognition software which may communicate by a wired or wireless connection with a database or said recognition software may alternatively comprise the database which may be updated periodically.

Figure 7:
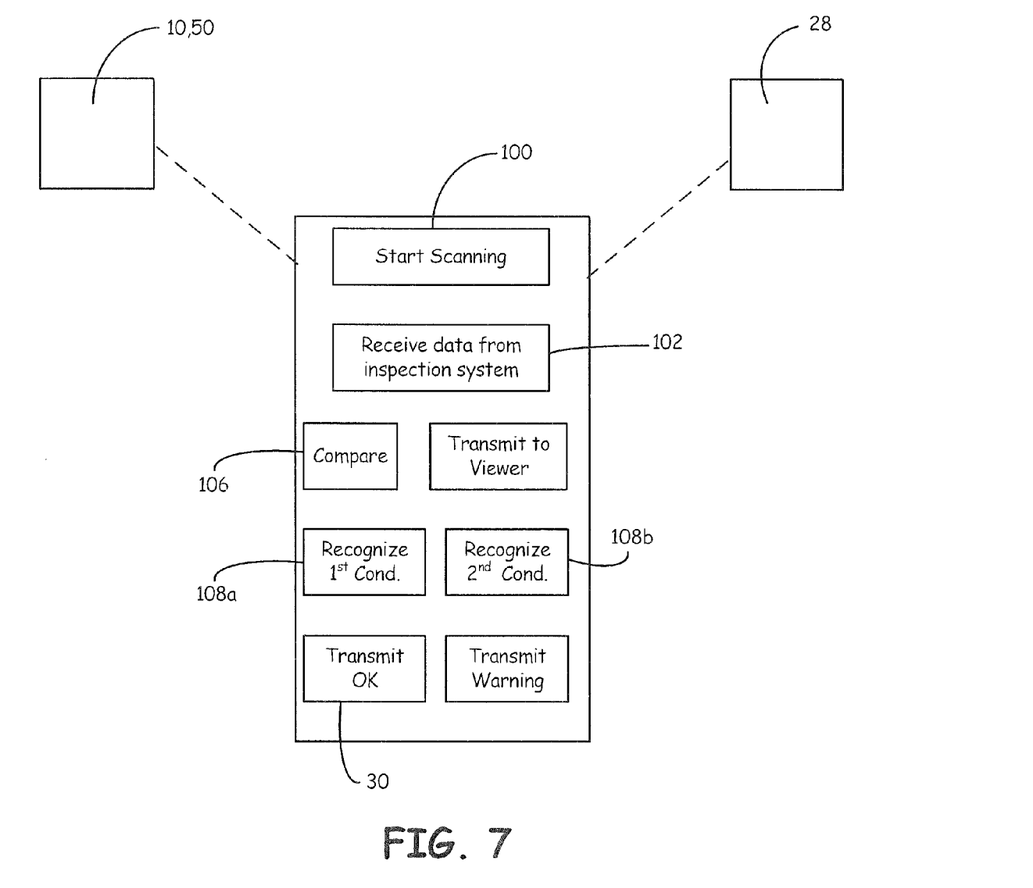
FIG. 7 is a flow chart illustrating recognition inspection.

One embodiment of the method of inspecting the undercarriage is illustrated in FIG. 7, the method comprises scanning the undercarriage of the vehicle with the inspection system which may comprise one or more cameras and a lighting system and/or the laser scanning system incorporated into either the mobile or stationary unit (100) and transmitting the data from the inspection system to the controller (102). The controller can transmit visual data in the form of images or video (downloadable or streamed) directly to display unit (104) and/or the controller is configured to compare the data received from the unit to data stored and accessible by the controller where the data received is compared to a stored condition of said particular undercarriage and the controller is configured to recognize a first condition matching the stored condition or to recognize that transmitted condition does not match the stored condition (106). In the event the data received matches the stored data for the same undercarriage, a first signal is sent indicating that conditions are initially matching and are "all clear" (108A). When the data received deviates from the stored data for the same undercarriage, an alternative signal is sent to the display unit indicating a warning requiring further inspection of the undercarriage (108B).

Stored data related to specific undercarriage configurations, arrangements, specification and/or schematics is accessible by the controller. The stored data is gathered and stored in a database and may be gathered from manufacturers and stored by make and model wherein prior to inspecting the vehicle, the data is manually selected from the database for comparison by the controller. Alternatively, various manufacturers or other entities who have provided modifications to various undercarriages may provide data to the database for more accurate remote inspection which removes some level of human interaction and human error from the inspection process.

Although the present invention has been described with reference to preferred embodiments, workers skilled in the art will recognize that changes may be made in form and detail without departing from the spirit and scope of the invention.

What is claimed:

1. An undercarriage inspection system, the system comprising:
   a motorized wheeled cart having:
      a frame having a center platform mounted thereon;
      at least one retractable arm extending outwardly from the frame; and
      at least one lighting element mounted on the cart;
      at least one camera mounted on the cart; and
      wherein the system is configured to fit in a space below a vehicle and the at least one camera is configured to capture at least one image of the undercarriage of the vehicle.

2. The system of claim 1, and further comprising a controller in wireless communication with the motorized wheeled cart and configured to remotely move the cart in the space below the vehicle.

3. The system of claim 1, and further comprising a controller in wireless communication with the at least one lighting element and the at least one camera and configured to control the lighting element and the camera for inspection of the undercarriage.

4. The system of claim 3, and further comprising a monitor wirelessly connected to the controller and positioned away from the cart, wherein the monitor is configured to receive and display images transmitted from the at least one camera as the motorized wheeled cart is in the space below the vehicle.

5. The system of claim 1, and further comprising at least one infrared camera positioned on the cart, the infrared camera configured to capturing images of the undercarriage and configured to transmit the images to a monitor.

6. The system of claim 1, and further comprising at least one laser source for laser scanning the undercarriage and configured to transmit data related to the laser scan to the controller.

7. The system of claim 1, wherein the at least one lighting element is an LED light mounted on the cart and configured to illuminate the field of the view the at least one camera.

8. An undercarriage inspection system, the system comprising:
   a ground engaging housing having an open top and a cavity configured to receive:
      at least one camera mounted therein;
      at least one laser source mounted therein:
      at least one lighting element mounted therein; and
   wherein the system is configured to fit in a space below a vehicle and the at least one camera is configured to capture at least one image of the undercarriage of the vehicle and the at least one laser source is configured to produce a laser beam to laser scan the undercarriage of the vehicle.

9. The system of claim 8, and further comprising a protective cover configured to fit the open top of the housing, the protective cover comprising a transparent material.

10. The system of claim 8, wherein the housing is configured to accommodate two or more cameras spaced apart therein and two or more lighting elements positioned therein.

11. The system of claim 8, and further comprising a controller in wireless communication with the at least one lighting element and the at least one camera and configured to control the lighting element and the camera for inspection of the undercarriage.

12. The system of claim 11, and further comprising a monitor wirelessly connected to the controller and positioned away from the housing, wherein the monitor is configured to receive and display images transmitted from the at least one camera as the housing is in the space below the vehicle.

13. The system of claim 8, and further comprising at least one infrared camera positioned in the housing, the infrared camera configured to capture images of the undercarriage and further configured to transmit the images to a monitor.

14. A method of remotely inspecting an undercarriage of a vehicle, the method comprising:

providing at least one camera and at least one lighting source to a housing configured to fit in a space below the vehicle;

providing at least one laser source to the housing;

providing a controller wirelessly connected to the at least one camera, the at least one lighting source, and the at least one laser source and configured to provide instructions to the at least one camera and the at least one lighting source for inspecting the undercarriage and to provide instructions to the at least one laser source for producing a laser beam and scanning the undercarriage;

providing a remote display configured to receive and display data transmitted from the at least one camera and the at least one laser source for inspecting the undercarriage; and remotely inspecting the undercarriage for the vehicle.

15. The method of claim 14, wherein the camera, laser source and the lighting source are provided in a movable housing comprising a remotely controlled movable cart configured to fit in the space below the vehicle and driving the movable cart through the space underneath the vehicle for inspecting the undercarriage of the vehicle.

16. The method of 14, where in the camera, laser source and the lighting source are provided in a stationary housing positioned on a ground engaging surface below the vehicle and configured to fit in the space below the vehicle and further comprising moving the vehicle over the housing for inspecting the undercarriage of the vehicle.

17. The method of claim 14, and transmitting the data from the at least one camera or the at least one laser source to a controller configured to compare the data received to a database of stored data for recognition of an unexpected condition of the undercarriage.

18. The method of claim 17, and sending one of a first signal to the remote display indicating a status of the recognition of an unexpected condition of the undercarriage indicating or a second signal indicating a status of the recognition of an expected undercarriage configuration.

* * * * *